United States Patent [19]

Smith

[11] 4,341,637
[45] Jul. 27, 1982

[54] REMOVING AND COLLECTING OIL

[76] Inventor: Peter B. Smith, Saltersford Hall, Holmes Chapel, Cheshire, England

[21] Appl. No.: 199,467

[22] PCT Filed: Dec. 19, 1979

[86] PCT No.: PCT/GB79/00215
§ 371 Date: Aug. 19, 1980
§ 102(e) Date: Aug. 12, 1980

[87] PCT Pub. No.: WO80/01293
PCT Pub. Date: Jun. 26, 1980

[30] Foreign Application Priority Data

Dec. 19, 1978 [GB] United Kingdom ............... 49122/78

[51] Int. Cl.$^3$ ................................................ C02F 1/40
[52] U.S. Cl. .................................... 210/662; 210/671;
210/86; 210/143; 210/242.4; 210/924
[58] Field of Search ............... 210/740, 400, 242, 923,
210/199, 143, 401, 386, 86, 662, 671, 924;
162/373

[56] References Cited

U.S. PATENT DOCUMENTS

| | | | |
|---|---|---|---|
| 2,220,925 | 11/1940 | Wilson | 210/400 |
| 3,617,552 | 11/1971 | Will | 210/400 |
| 3,700,108 | 10/1972 | Richards | 210/242.3 |
| 3,744,257 | 7/1973 | Spamer | 210/923 |
| 3,754,653 | 8/1973 | Verdon | 210/923 |
| 3,922,225 | 11/1975 | Stram | 210/242.3 |
| 3,957,646 | 5/1976 | Wichert | 210/923 |
| 4,053,406 | 10/1977 | Deslauriers | 210/242.3 |
| 4,076,624 | 2/1978 | Tolan | 210/923 |
| 4,145,279 | 3/1979 | Selby | 210/143 |
| 4,165,282 | 8/1979 | Bennett | 210/242.3 |

Primary Examiner—Ivars C. Cintins
Attorney, Agent, or Firm—W. R. Hulbert

[57] ABSTRACT

Apparatus is described for the removal and recovery of pollutant oil and the like floating on the surface of a body of water, comprising: means capable of the physical withdrawal of pollutant oil and the like with or without additional water from the water surface to a recovery station on site; means for spraying hot water over such pollutant oil and the like at said recovery station; a receiving tank for the oil/water washings resulting; an oil/water separator/coalescer for separating oil containing a minor quantity of water only from the washings; means for receiving such separated oil; means for recirculating water from said separator/coalescer for heating and further spraying; and means for returning any excess purified water from said separator/coalescer to said body of water.

A method for the removal and recovery of oil floating on the surface of a body of water is also described, which method comprises the steps: the physical withdrawal of pollutant oil and the like with or without additional water from the water surface to a recovery station on site; spraying hot water over such pollutant oil and the like at said recovery station; receiving the oil/water washings resulting; separating oil containing only a minor quantity of water from the washings; recirculating water from which oil has been separated for heating and further spraying; and returning any excess purified water to said body of water.

7 Claims, 8 Drawing Figures

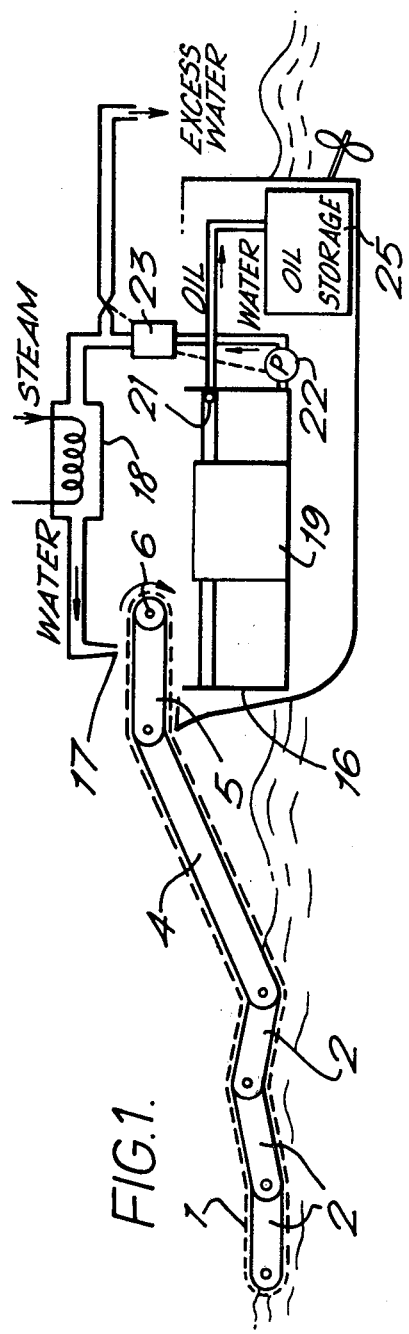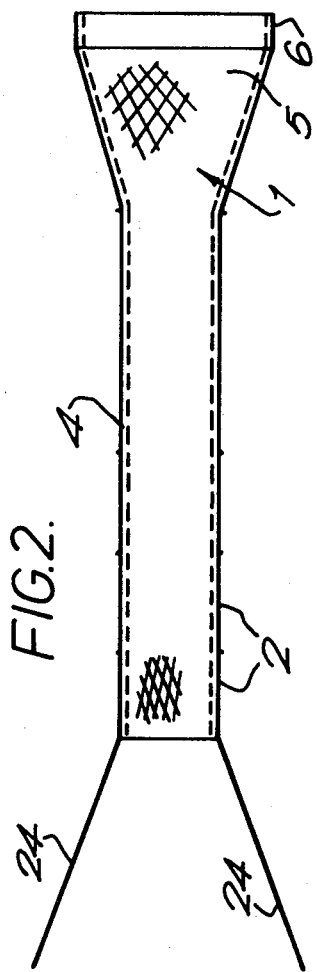

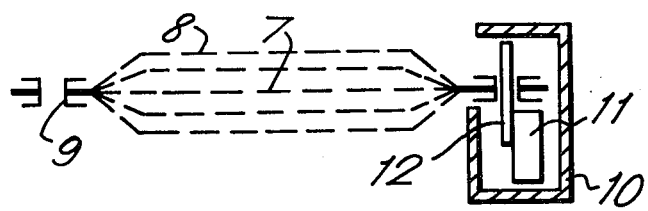
FIG.3.
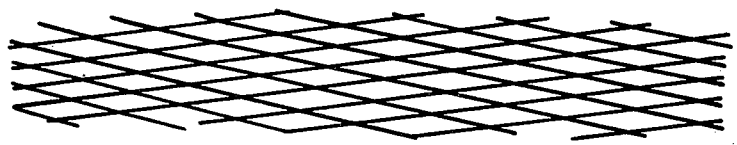
FIG.4.
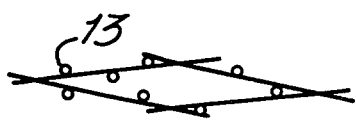 
FIG.5A.  FIG.5B.
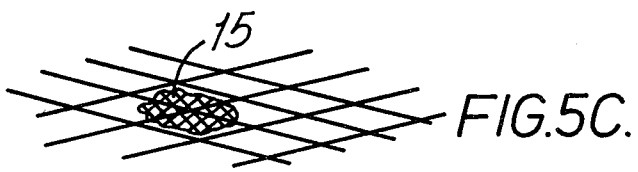
FIG.5C.

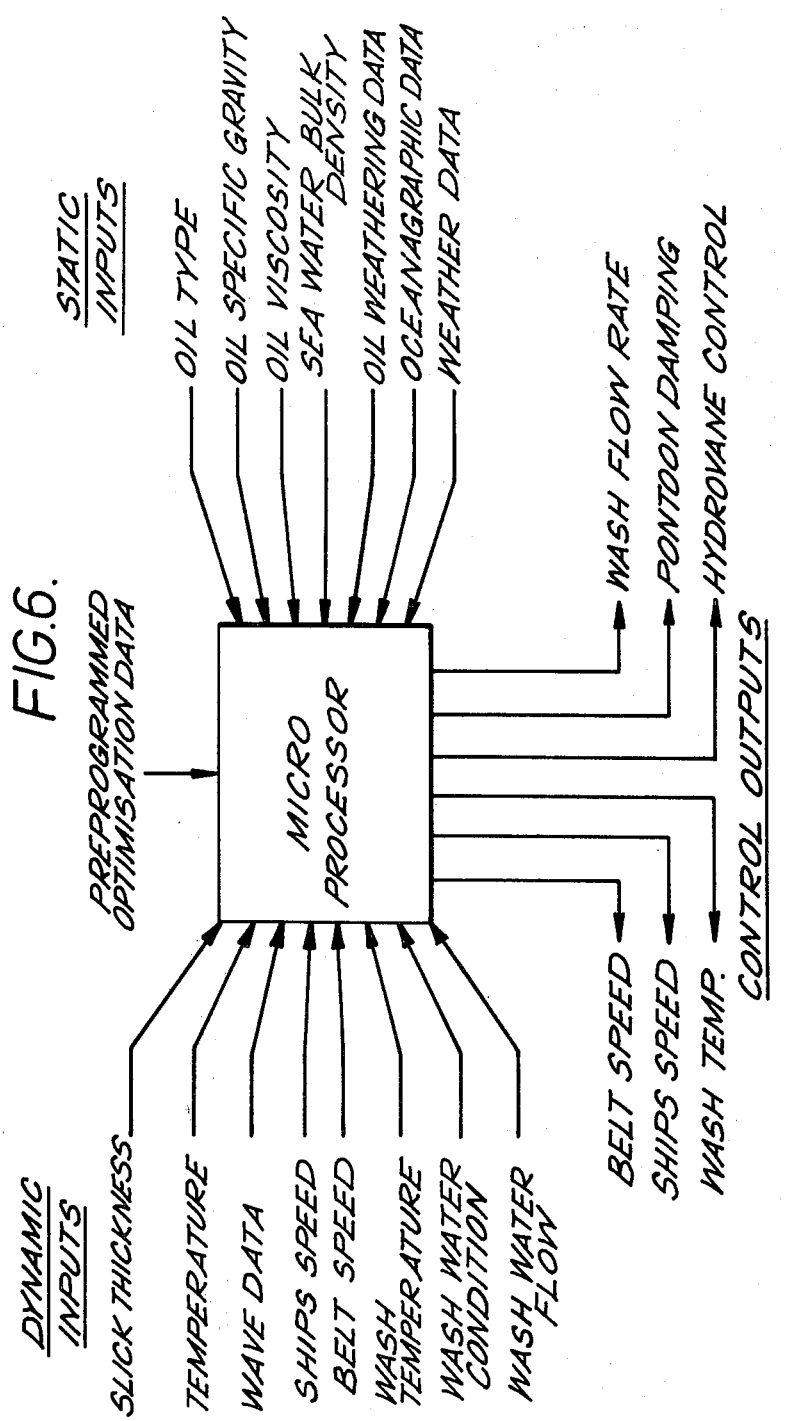

REMOVING AND COLLECTING OIL

FIELD OF THE INVENTION

This invention relates to the removal or recovery of oil floating on a water surface.

As will become apparent from the detailed description which follows, a principal use (although not necessarily the only use) for methods and apparatus in accordance with the present invention is in clearing up oil spillage which has occurred on the surface of the sea, rivers, inland waterways, gravel pits, etc., particularly where rapid removal of an oil slick has to be accomplished in order to avoid pollution and ecological damage.

BACKGROUND OF THE INVENTION

In recent years with increasing interest and concern with environmental problems, numerous systems have been proposed for removing and collecting oil floating on water surfaces. A principal disadvantage which has become apparent on seeking to put the numerous prior proposals into practice has been their marked inability to work effectively in a rough sea. This is especially so in the case of suction devices, where wave motion results in the device ingesting large quantities of sea water along with the oil, rendering the rate of oil removal unsatisfactorily slow and also resulting in a substantial volume of oil and sea water which must be retained on board a vessel for subsequent processing.

Of course, numerous proposals have been made for separating oil and water, but such arrangements are inherently bulky and are best suited to operation on land and with relatively small through-puts. So far as the inventor is at present aware, no recovery and separation system for oil and water has been previously proposed specifically for use at sea and proved successful. A major problem is the paradoxical requirement that an antipollution vessel working in a heavily polluted sea is itself bound by the oil discharge regulations not to discharge into the sea water which contains significant quantities of oil. The need, therefore, which has not previously been satisfied, so far as the present inventor is aware, is for a system which is both relatively quick and effective in separating oil and water.

DESCRIPTION OF THE INVENTION

The invention provides, in a first aspect, apparatus for the removal and recovery of pollutant oil and the like floating on the surface of a body of water, comprising: means capable of the physical withdrawal of pollutant oil and the like with or without additional water from the water surface to a recovery station on site; means for spraying hot water over such pollutant oil and the like at said recovery station; a receiving tank for the oil/water washings resulting; an oil/water separator/coalescer for separating oil containing a minor quantity of water only from the washings; means for receiving such separated oil; means for recirculating water from said separator/coalescer for heating and further spraying; and means for returning any excess purified water from said separator/coalescer to said body of water.

In a second aspect, the present invention provides a method for the removal and recovery of oil floating on the surface of a body of water, which method comprises the steps of: the physical withdrawal of pollutant oil and the like with or without additional water from the water surface to a recovery station on site; spraying hot water over such pollutant oil and the like at said recovery station; receiving the oil/water washings resulting; separating oil containing only a minor quantity of water from the washings; re-circulating water from which oil has been separated for heating and further spraying; and returning any excess purified water to said body of water.

The term "pollutant oil and the like" is used herein to encompass one or more of oil, including heavy crude oil or heavier tarry constituents of oil, oil/water mousse, and other petroleum of liquid fuel based products, liable to pollute bodies of water whether inadvertantly or by illegal or antisocial design.

The receiving station is suitably a floating vessel. The separator/coalescer is preferably a corrugated plate separator. A pump is provided for the recirculation of water and the system is preferably controlled by a microprocessor linked to an oil content monitor in the recirculation stream.

Numerous means are known for physically withdrawing oil and/or oil/water mousse from water surfaces and the present invention may be practiced with any such known physical or mechanical arrangements. In particular, the present invention may be employed with scoops, sweeping boom arrangements, vacuum arrangements, etc. The present invention is not limited to any particular such arrangement but is generally applicable.

The invention is hereinafter more particularly described by way of example only with reference to the accompanying drawings.

BRIEF DESCRIPTION OF THE DRAWINGS

FIG. 1 is a schematic cross-sectional view through an apparatus constructed in accordance with the present invention mounted on and from a ship.

FIG. 2 is a view of the physical withdrawal means of the apparatus of FIG. 1 seen from above.

FIG. 3 is a sectional view taken along the line III—III in FIG. 2.

FIG. 4 shows a small section of the physical withdrawal means shown in FIGS. 1 to 3.

FIGS. 5A, 5B and 5C schematically illustrate the manner in which oil is withdrawn from the sea in the apparatus of FIGS. 1 to 4.

FIG. 6 schematically illustrates the microprocessor control circuit.

DESCRIPTION OF THE PREFERRED EMBODIMENTS

FIGS. 1 and 2 show one form of mechanical arrangement for removing oil from the surface of the sea and bringing it on board a vessel. The arrangement here shown is, I believe, itself novel, and is described in and is the subject of British patent application No. 49121/78 and British patent application No. 43787/79 which claims priority from 49121/78. An endless belt 1 formed of expandable mesh material, and having oleophilic properties, is supported on a series of pontoons 2 floating on the surface of the sea, on a support 4 rising from the sea surface, and on a shipborne support section 5. Drive 6 for the belt 1 is provided at the inboard side of section 5.

The preferred construction for the belt is shown in FIG. 3 in section. It will be seen that the belt is of compound construction including a number of component layers 7 with various size mesh to thereby collect (as will be explained below) a broad range of oil droplet sizes. The layers 7 are sandwiched between outer layers of a heavy support mesh 8. The edges of the belt are formed by heat bonding and by inserting a series of eyelets 9. Also shown in section in FIG. 3 is one guide-box 10. A similar guidebox would be provided for the other side of the belt. The guide-boxes extend along the respective edges of the support 2, 4 and 5. Within the guide-boxes run respective drive chains 11 provided with upstanding pins 12 at sections therealong for coaction with the apertures defined by the eyelets 9. The several pontoons 2 and the rising section 4 all have the same lateral width which is chosen so that the mesh is in a relatively unexpanded condition (as shown in FIG. 4). The length to width ratio for respective mesh cells in this natural, unstressed condition may be of the order of 8:1. As is best shown in FIG. 2, section 5 broadens out from its junction with the rising section 4 to its inboard end. Thus, as the belt travels along the section 5 towards the inboard end, the mesh is steadily expanded laterally by the drive chains 11 and pins 12 pulling the respective longitudinal edges of the mesh. In the fully "open" conditions, each mesh cell may have a length to width ratio of approximately 1:1.

The material of the expandible mesh is preferably itself oleophilic. A suitable material is polypropylene. Expandible polypropylene mesh material is readily available for example from Netlon Limited. The mesh (whether itself oleophilic or not) is suitably (though not necessarily if the material is itself oleophilic) provided with an oleophilic coating. Thus, the most preferred mesh is formed of polypropylene and is treated with a silicone coating which is cured thereon.

Since the mesh material is oleophilic, oil floating in the surface regions of the sea 3 will tend to be attracted to the mesh, and will be picked up by the belt. Fine discrete droplets of oil will tend to adhere to the surface of the mesh material, as shown at 13 in FIG. 5A. Motion of the belts themselves, aided by wave motion, will tend to move the individual droplets along the strands of mesh material, so increasing the chance of coalescence of these droplets 13 into larger droplets. The oleophilic nature of the mesh material together with surface tension effects will provide a "bridging" effect in the voids in the mesh cells so that somewhat larger droplets or larger quantities of oil will tend to adhere to the mesh as shown at 14 in FIG. 5B. Larger lumps of oil or semi-solid oil/water mousse will tend to be physically lifted out of the water by the moving belt as shown at 15 in FIG. 5C. As the process continues and the belt progresses from the sea on board the ship, coalescence between oil carried in any of the manners 13, 14 or 15 will tend to occur. By forming the belt with a compound construction as described above with reference to FIG. 3, droplets of different sizes will find a mesh size best suited for retaining same, so that the effect of employing a compound belt is to increase the quantity of oil which will be picked up and also to ensure that the apparatus will work effectively over a broad range of conditions which might be found in practice at sea.

At all events, as described above, when the belt reaches the support section 5, the mesh will be steadily expanded laterally to "open" the mesh cells. As will be appreciated, this facilitates detachment of oil carried by the belt. Indeed, drops such as that shown at 14 in FIG. 5B may simply fall through the space in the mesh into receiving tank 16.

The system consisting of the belt 1, the floating pontoon support 2, the rising section 4, and the inboard support section 5 has been described in detail hereinabove since it is a means of this kind which I currently prefer to employ for the physical withdrawal of oil and/or oil/water mousse from the surface of the sea on board the recovery vessel. For a more detailed description of modified versions of this apparatus the reader is referred to British patent application No. 43787/79 mentioned above. The processing means, whereby oil containing minor quantities only of water (as little as, say, 5% or less) is recovered and stored will be described in detail below. It will be appreciated that such spearation, recovery and storage system, which forms means, relating to an essential element of the invention, for putting that invention into effect may be employed with other embodiments of physical withdrawal means.

For example, a solid belt skimmer arrangement is available from Rexnord Inc., and could be used with the recovery system. Again, a rope skimmer arangement known under the trade name "Oil Mop" could also be used. In this latter arrangement, a multi-strand rope is placed in the sea to suck up oil preferentially, is withdrawn on board and is squeezed or compressed to physically remove oil (together with some water) adhering to the rope. Other arrangements involving scoops, moving booms, paddle arrangements rotating about a vertical axis and coupled to a suction line, etc. may equally well be employed.

In any event, pollutant oil and the like (that is to say: oil, and/or oil/water mousse, etc.) with or without additional water is withdrawn from the water surface to a recovery station on site, which in the case of oil recovery at sea will be a floating vessel. Hot water is sprayed over such oil and/or oil/water mousse, etc. at the recovery station and the washings are received in a tank. In the particular arrangement illustrated, hot water is sprayed over support section 5 from a plurality of nozzles 17 and aids in physical detachment of oil droplets from the belt. The water is heated as, for example, by means of a heat exchanger 18 which may derive heat from the steam heating system of the ship. The majority of small droplets 13 and drops 14 will tend either to fall through the spaces in the mesh or to be stripped from the belt by the hot water spray. Large lumps of semi-solid oil/water mousse not so detached will tend to fall off the belt when the belt starts its return run and to fall into the hot water washings. The hot water tends to break up the large oil lumps. The water washings together with any oil/water lumps are received in a tank 16 and are subjected to separation, the hot water already having broken up the large oil lumps to some extent. Any suitable separator and/or coalescer system may be employed, but that which I prefer is a corrugated plate separator 19 of the kind manufactured by Fram Europe Limited. Such a separator allows oil containing a minor quantity of water only (as little, say, as 5% water) to be withdrawn from the tank by means of an oil skimmer 21. The remaining water containing only minor quantities of remaining oil is used being pumped by means of a pump 22 from the bottom of the tank via an oil content monitor 23 to the heat exchanger 18. As the water circulatory system is essentially closed, heating may be accomplished with a relatively low expenditure of energy. Some sea water may be carried on board the vessel even when the preferred belt arrangement is employed. With other forms of physical withdrawal means rather more sea water may be brought on board.

An excess of water will thus tend gradually to accumulate in the system. Such excess water may be discharged to sea automatically from the system at a position between the oil content monitor and the heat exchanger, though in this case, the monitored oil content in the water must be sufficiently low to meet the oil discharge regulations.

The efficiency of the oil removal and the oil/water separating systems are affected by many variables, including, but not limited to, oil type and condition, sea temperature, oil slick thickness, mesh belt speed, vessel speed, wave motion, wash water temperature, wash water flow, and wash water contamination. All of these variables affect the efficiency of the removal and separation systems singularly and in interaction with each other.

The microprocessor control circuit of FIG. 6, using conventional digital computing techniques is employed to simultaneously receive input data from a plurality of sensors indicative of the said efficiency affecting variables and to process such data singularly and in interaction with each other in accordance with a pre-set program to optimise the efficiency of the system over a wide range of operation conditions.

In particular the flow rate of water in the system is adjusted by regulation of pump 22 in accordance with the residual oil content signal provided by monitor 23 so as to achieve a sufficiently low oil content in the efflux water irrespective of varying oil concentrations received in tank 6.

In general, it is preferred to employ the following sensors to provide input data to the microprocessor:

1. Temperature sensors in the sea water and in the wash water;
2. Capacitance or resistance probes placed immediately ahead of the distal pontoon section to sense oil slick thickness;
3. Tachometers attached to the mesh belt drive and the wash water pump to provide belt speed and water flow data;
4. Rotational sensors fitted to the hinge points between pontoon sections to provide data on wave height and period;
5. A signal from the ship's log proportional to vessel speed through the water; and
6. A signal from the oil content monitor 23 proportional to the amount of oil remaining in the wash water.

Certain data is manually entered into the microprocessor at the start of a pollutant oil recovery operation. Such data includes:

(a) Oil type;
(b) Oil viscosity;
(c) Oil specific gravity;
(d) Length of time that oil has been in contact with water;
(e) Minimum and maximum temperatures that oil water mixture has been exposed to since the spill;
(f) Oceanographic data; and
(g) Bulk density of sea water.

From this manually entered data, the optimum separation characteristics, the most probable oil droplet size distribution and the mousse condition can be computed.

Static data manually entered and dynamic data from the various sensors is processed in accordance with the preset program to provide control signals to controllable components, which may include:

(a) Angle setting means for controlling the depth of the pontoon sections;

(b) Belt drive motor 6 to optimise oil load on the belt;
(c) Hydraulic dampers at pontoon section hinge points to provide optimum wave following characteristics by changing the natural frequency and damping factors of the pontoon sections;
(d) Flow and temperature of the wash water to optimise separation efficiency and the breakdown of "mousse"; and
(e) A visual indication of optimum ships speed to the helmsman.

For example, the detection of a very thick slick of high specific gravity oil that had been in cold water for many days would signal the angle-setting means to position the "nose" of the distal pontoon section deep into the oil/water interface and speed up the belt drive 6 to maximise the belt loading whilst signalling the ship to slow down if the oil slick thickness and condition indicated more oil than the belt could handle. The oil type and condition data manually entered would have computed the correct wash water temperature to optimise the mesh cleaning, oil separation and mousse breakdown capabilities.

The data from the oil content monitor is used to "fine tune" ship speed, belt speed and water flow by conventional negative feed-back techniques to maximise pick-up rate by optimising separator efficiency.

While the invention has largely been described with reference to the illustrated expandable mesh belt arrangement for the mechanical removal of pollutant oil and the like from the surface of a body of water, the teachings herein may equally well be applied, with appropriate modifications and adaptations which will readily occur to the man skilled in this art, to other forms of physical withdrawal of pollutant oil and the like from water surfaces.

What is claimed is:

1. Apparatus for the removal and recovery of pollutant oil and the like floating on the surface of a body of water, comprising:
    recovery means for withdrawing pollutant oil and the like with possible additional water from the water surface and carrying it to a recovery station, said recovery means comprising an endless belt formed of expandable mesh material, and having oleophilic properties, which belt is disposed to pass round a plurality of pontoon sections floating at or adjacent the water surface and then out of the water to said recovery station,
    means for removing the pollutant oil and the like including means for spraying hot water over said recovery means to remove such pollutant oil and the like at said recovery station and means for expanding the mesh of the belt in a direction at right angles to the direction of movement thereof to faciliate detachment of pollutant oil and the like from said belt by said hot water spray;
    a receiving tank for receiving the oil/water washings resulting from said means for removing;
    an oil/water separator/coalescer for separating oil containing only a minor quantity of water from the washings;
    means for receiving such separated oil;
    means for recirculating water from said separator/coalescer and directing said recirculated water to a heating means and then to said means for spraying;
    and means for returning any excess purified water from said separator/coalescer to said body of water.

2. Apparatus according to claim 1, wherein the receiving station is a floating vessel and wherein said apparatus is mounted on and from said vessel, separated oil being stored in the vessel's hold.

3. Apparatus according to claim 1, further comprising an oil content monitor adapted to monitor residual oil content in the recirculated water and arranged to generate a control signal for controlling said excess water return means to allow discharge of excess water only when said residual oil content is below a predetermined level.

4. Apparatus according to claim 1, wherein said separator/coalescer comprises a parallel plate separator.

5. A method for the removal and recovery of pollutant oil and the like floating on the surface of a body of water, which method comprises the steps of:

withdrawing pollutant oil and the like from the water surface by passing an endless belt formed of expandible mesh material, and having oleophilic properties, round a plurality of pontoon sections floating at or adjacent the water surface and then out of the water to a recovery station;

spraying hot water over said recovery means to remove such pollutant oil and the like at said recovery station;

receiving the oil/water washings resulting;

separating oil containing only a minor quantity of water from the washings;

recirculating water from which oil has been separated for heating and further spraying;

and returning any excess purified water to said body of water.

6. A method according to claim 5, wherein the residual oil content of said recirculated water is monitored and return discharge of excess water is controlled in accordance therewith.

7. A method according to claim 5, wherein said method is performed at sea under the control of a microprocessor receiving variable input data relating to one or more of the temperature of the sea water and of the said hot water, to oil slick thickness, to belt speed and hot water flow rate, to wave height and period, to ship's speed through the water;

and wherein the residual oil content of said recirculated water is monitored to provide a further variable input for said microprocessor;

the microprocessor being preset with data relating to one or more of: oil type, oil viscosity, oil specific gravity, length of time the oil has been in the sea, minimum and maximum ambient temperatures to which it has been exposed since spilling into the sea, oceanographic data, and the bulk density of the sea water;

and the microprocessor providing control signals for controlling one or more of: the speed of said belt to optimise oil load thereon, said angle setting means to select said leading angle, hydraulic dampers at hinge points between pontoon sections to provide optimum wave following profiles, and flow rate and temperature of said heated water, and optionally for providing a visual indication to the helmsman of optimum ship's speed.

* * * * *